(12) United States Patent
Yoon et al.

(10) Patent No.: US 9,237,299 B2
(45) Date of Patent: Jan. 12, 2016

(54) DISPLAY APPARATUS

(75) Inventors: Kyoung Sang Yoon, Seongnam-si (KR); Kyung Jae Park, Paju-si (KR); Chang Hee Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 3 days.

(21) Appl. No.: 13/330,323

(22) Filed: Dec. 19, 2011

(65) Prior Publication Data

US 2012/0162880 A1 Jun. 28, 2012

(30) Foreign Application Priority Data

Dec. 23, 2010 (KR) ........................ 10-2010-0133427

(51) Int. Cl.
*G02F 1/1339* (2006.01)
*H04N 5/64* (2006.01)
*G02F 1/1333* (2006.01)

(52) U.S. Cl.
CPC ................ *H04N 5/64* (2013.01); *G02F 1/1339* (2013.01); *G02F 1/133308* (2013.01); *G02F 2001/133314* (2013.01); *G02F 2001/133317* (2013.01); *G02F 2001/133322* (2013.01); *G02F 2001/133325* (2013.01)

(58) Field of Classification Search
USPC ......................................... 361/679.21–679.3
See application file for complete search history.

(56) References Cited

U.S. PATENT DOCUMENTS

| | | | | |
|---|---|---|---|---|
| 5,150,231 A * | 9/1992 | Iwamoto | ........... | G02F 1/133308 349/122 |
| 5,995,170 A | 11/1999 | Ohira et al. | | |
| 6,252,639 B1 * | 6/2001 | Giannatto | ............. | G02F 1/1333 349/58 |
| 6,950,308 B2 * | 9/2005 | Saitoh | ............... | G02F 1/133308 348/E9.027 |
| 7,944,527 B2 * | 5/2011 | Jeon | ...................... | G02B 6/0068 349/58 |
| 8,817,203 B2 * | 8/2014 | Lee | ................... | G02F 1/133608 349/58 |
| 2003/0128307 A1 * | 7/2003 | Ito | ...................... | G02F 1/133308 349/58 |
| 2005/0243573 A1 * | 11/2005 | Kim | ..................... | G02B 6/0086 362/600 |
| 2006/0158579 A1 * | 7/2006 | Hasegawa | ......... | G02F 1/133308 349/58 |
| 2007/0132917 A1 * | 6/2007 | Kim | ................... | G02F 1/133512 349/65 |
| 2007/0152956 A1 * | 7/2007 | Danner | ................... | G02F 1/161 345/107 |
| 2007/0165170 A1 * | 7/2007 | Fukuda | ................. | G02F 1/1333 349/138 |
| 2007/0241993 A1 | 10/2007 | Monden et al. | | |
| 2007/0268425 A1 * | 11/2007 | Jung | ................. | G02F 1/133308 349/58 |
| 2008/0143949 A1 * | 6/2008 | Ino | .................... | G02F 1/133308 349/151 |
| 2008/0151138 A1 | 6/2008 | Tanaka | | |
| 2008/0297680 A1 * | 12/2008 | Hwang | ............. | G02F 1/133308 349/58 |

(Continued)

FOREIGN PATENT DOCUMENTS

| | | |
|---|---|---|
| CN | 1952744 A | 4/2007 |
| CN | 101059613 A | 10/2007 |
| CN | 101221310 A | 7/2008 |

(Continued)

*Primary Examiner* — Zachary M Pape
*Assistant Examiner* — Douglas Burtner
(74) *Attorney, Agent, or Firm* — Birch, Stewart, Kolasch & Birch, LLP (57) ABSTRACT

Discussed is a display apparatus which facilitates to minimize a thickness by innovatively removing a case and some portions of a set cover, which have been regarded as indispensible structures for the display apparatus, and simultaneously facilitates to realize a good sense of beauty in the display apparatus by a novel design, wherein the display apparatus comprises a set cover which has a space prepared by a sidewall; a display panel which includes lower and upper substrates bonded to each other; and a guide frame which supports the display panel, and seals a gap between a sidewall of the set cover and a lateral side of the display panel, wherein the guide frame is provided in the set cover.

11 Claims, 4 Drawing Sheets

(56) References Cited

U.S. PATENT DOCUMENTS

| | | | |
|---|---|---|---|
| 2009/0115942 A1* | 5/2009 | Watanabe | G02F 1/133305 349/96 |
| 2009/0185101 A1* | 7/2009 | Matsuhira | G02F 1/1339 349/58 |
| 2009/0261718 A1* | 10/2009 | Ha | H01L 51/5237 313/504 |
| 2010/0147582 A1 | 6/2010 | Shin et al. | |
| 2010/0296027 A1* | 11/2010 | Matsuhira | G02F 1/133308 349/96 |
| 2011/0255036 A1* | 10/2011 | Aaltonen | G02F 1/133308 349/96 |
| 2011/0260960 A1 | 10/2011 | Jean et al. | |
| 2012/0268868 A1* | 10/2012 | Yoon | G02F 1/133308 361/679.01 |

FOREIGN PATENT DOCUMENTS

| | | |
|---|---|---|
| CN | 201583758 U | 9/2010 |
| EP | 0 435 343 A2 | 12/1990 |
| JP | 9-44096 A | 2/1997 |
| JP | 2000-293115 A | 10/2000 |

* cited by examiner

DISPLAY APPARATUS

CROSS REFERENCE TO RELATED APPLICATIONS

This application claims the benefit of the Korean Patent Application No. 10-2010-0133427 filed on Dec. 23, 2010, which are hereby incorporated by reference as if fully set forth herein.

BACKGROUND

1. Field of the Invention

The present invention relates to a display apparatus, and more particularly, to a display apparatus which facilitates to minimize a thickness by innovatively removing a case and/or some portions of a set cover, which have been regarded as indispensible structures for the display apparatus, and simultaneously facilitates to realize a good sense of beauty in the display apparatus by a novel design.

2. Discussion of the Related Art

Recently, various flat-type display devices, which substitutes for Cathode Ray Tube (CRT), have been actively researched and studied, for example, Liquid Crystal Display (LCD) device, Plasma Display Panel (PDP), Field Emission Display Device (FED), Light Emitting Display (LED) device, and etc. Especially, the LCD device has attracted great attentions owing to the advantageous properties such as mass production technology, simple driving means, and high picture quality.

Recent research and development are particularly being required on designs of products appealing to consumers. Consequently, efforts for minimizing the thicknesses (slimness) of LCD devices are continuously being made, and research is being conducted on a design with enhanced sense of beauty that can induce consumers to buy by appealing to consumers' sense of beauty.

In efforts for minimizing the thicknesses of LCD devices and design development for enhancing a sense of beauty that have been made to date, however, the existing elements have been applied as is, the structures of the elements have been changed simply, and thus, there are limitations in minimizing the thicknesses of the LCD devices and developing new designs of the LCD devices.

For example, a related art LCD device necessarily uses lower and upper cases to receive a liquid crystal display panel and a backlight unit therein. In addition, front and rear set covers are additionally used in the related art LCD device to manufacture a product such as a notebook computer, a monitor, a mobile device, or a television. As the lower and upper cases and the front and rear set covers for the manufactured device are inevitably used, it makes a limitation in the slimness of the display device and the advance toward the new design. Especially, the front edge parts of the liquid crystal display panel are covered with the upper case and the front set cover, whereby the liquid crystal display device is increased in its thickness. Also, the border width of the liquid crystal display device may be increased so that the difference in height of the stepped portion may cause limitations in advance toward the innovative design.

SUMMARY

Accordingly, the present invention is directed to a display apparatus that substantially obviates one or more problems due to limitations and disadvantages of the related art.

An aspect of the present invention is to provide a display apparatus which facilitates to minimize a thickness by innovatively removing a case and some portions of a set cover, which have been regarded as indispensible structures for the display apparatus, and simultaneously facilitates to realize a good sense of beauty in the display apparatus by a novel design.

Another aspect of the present invention is to provide a display apparatus which facilitates to seal a gap between a display panel and a set cover, the gap which might occur by removing case and/or portions of set cover.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display apparatus comprising: a set cover which has a space prepared by a sidewall; a display panel which includes lower and upper substrates bonded to each other; and a guide frame which supports the display panel, and seals a gap between a sidewall of the set cover and a lateral side of the display panel, wherein the guide frame is provided in the set cover.

At this time, the guide frame includes: a panel supporting part onto which the display panel is placed; and a sealing member which seals the gap between the sidewall of the set cover and the lateral side of the display panel, wherein the sealing member is formed in the panel supporting part.

Also, the panel supporting part and the sealing member are formed as one body by a double injection method or insert injection method.

The sealing member is formed of rubber, thermoplastic urethane, or thermoplastic elastomer.

The sidewall of the set cover and the sealing member form a front edge portion of the display panel.

The display panel includes an upper polarizing plate attached to a front surface of the upper substrate, wherein respective upper surfaces of the sidewall of the set cover, the sealing member, and the upper polarizing plate are provided at the same height along the same horizontal line.

Furthermore, the display apparatus comprises a plurality of coupling members combined with the set cover via the panel supporting part, the coupling members for combining the guide frame with the set cover.

In addition, the display apparatus comprises an adhesive member formed between the panel supporting part and the display panel, the adhesive member for placing the displaying panel onto the panel supporting part.

The display panel includes a lower polarizing plate attached to a rear surface of the lower substrate, wherein the adhesive member is formed between the panel supporting part and the lower substrate, or between the panel supporting part and the lower polarizing plate.

The set cover includes a sidewall groove which is hollowly formed from an inner sidewall.

The guide frame includes: a panel supporting part on which the display panel is placed; a first sealing member which is formed as one body with the panel supporting part, the first sealing member for sealing the gap between the sidewall of the set cover and the lateral side of the display panel; and a second sealing member which protrudes from the sidewall of the first sealing member, and is inserted into the sidewall groove of the set cover, the second sealing member for preventing foreign matters from being penetrated via a gap between the sidewall of the set cover and the first sealing member.

The first and second sealing members are formed of rubber, thermoplastic urethane, or thermoplastic elastomer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display apparatus according to the present invention will be described with reference to the accompanying drawings.

Figure 1:
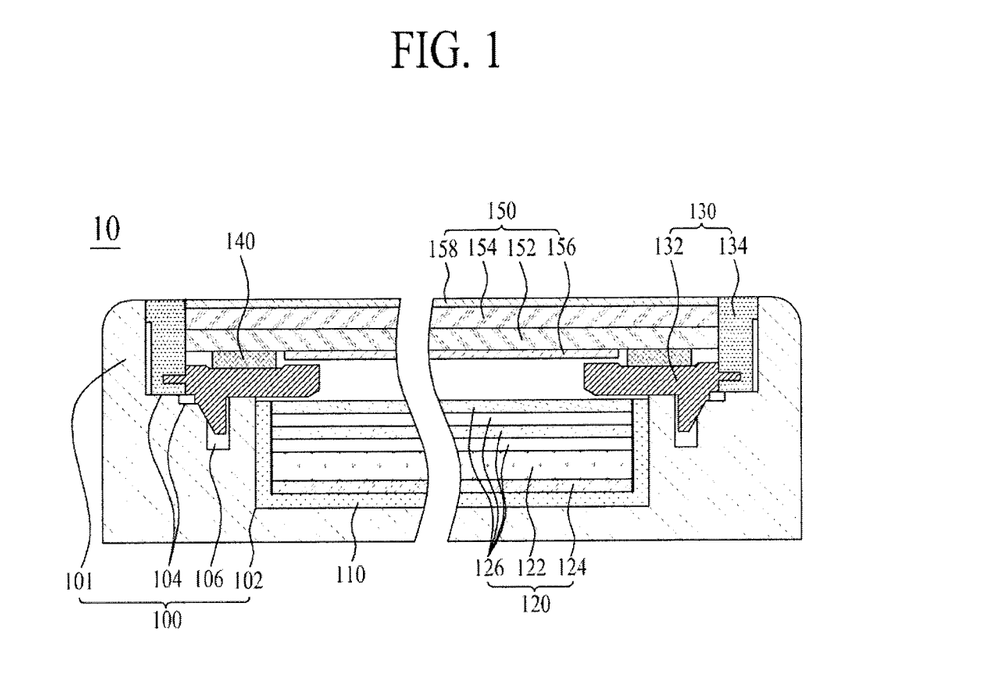
FIG. 1 illustrates a display apparatus according to the first embodiment of the present invention.

FIG. 1 illustrates a display apparatus according to the first embodiment of the present invention.

Referring to FIG. 1, the display apparatus 10 according to the first embodiment of the present invention includes a set cover 100, a bottom cover 110, a backlight unit 120, a guide frame 130, an adhesive member 140, and a display panel 150.

The set cover 100 is formed in a square-shaped frame structure. The set cover 100 may be formed of plastic or metal material. For enhancing the sense of beauty in the manufactured display apparatus, it is preferable that the set cover 100 be formed of the metal material.

The set cover 100 functions as a later and rear cover of the manufactured display apparatus (for example, notebook computer, monitor, or television). Also, the set cover 100 supports the bottom cover 110 and the guide frame 130. For this, the set cover 100 includes a space 102 prepared by a sidewall, and a frame supporting part 104 formed with a stepped portion from the sidewall.

The space 102 is prepared inside of the display apparatus 10 by the sidewall. Then, the bottom cover 110 is received and supported in the space 102 of the set cover 100.

The frame supporting part 104 is provided with the stepped portion from the sidewall, to thereby support the guide frame 130. In this case, the frame supporting part 104 includes a frame combining part 106 to be combined with the guide frame 130.

The bottom cover 110 is received in the space 102 of the set cover 100, and the backlight unit 120 is received in the bottom cover 110. Preferably, the bottom cover 110 is formed of a metal material so as to smoothly dissipate heat generated in the backlight unit 120 to the external. The bottom cover 110 may be fixed to the space 102 of the set cover 100 by the use of both-sided tape or coupling screw. Depending on the structure of the display apparatus 10, the bottom cover 110 may be omissible.

The backlight unit 120 is received in the bottom cover 110, wherein the backlight unit 120 emits light toward the rear of the display panel 150. If the bottom cover 110 is omitted, the backlight unit 120 emits light toward the rear of the display panel 150 while being received in the space 102 of the set cover 100. For this, the backlight unit 120 includes a light-guiding plate 122, a reflective sheet 124, and an optical member 126.

The light-guiding plate 122 is formed having a light-incidence surface, whereby the light-guiding plate 122 guides the light, which is emitted from a light source (not shown) and is then incident on the light-incidence surface, toward the display panel 150. At this time, the light source (not shown) may include a substrate, and a plurality of light-emitting diodes mounted on the substrate, but not necessarily. Instead of the light-emitting diodes, fluorescent lamps may be included.

The reflective sheet 124 is arranged on the rear surface of the light-guiding plate 122, and is placed on the set cover 100. The reflective sheet 124 reflects the incident light toward the light-guiding plate 122.

The optical member 126, which is provided on the light-guiding plate 122, improves luminance property of the light advancing toward the display panel 150 from the light-guiding plate 122. For this, the optical member 126 may include a lower diffusion sheet, at least one prism sheet, and an upper diffusion sheet.

The guide frame 130, which is combed with the set cover 100, supports the display panel 150, and seals (or removes) a gap between the set cover 100 and the display panel 150. For this, the guide frame 130 may include a panel supporting part 132 and a sealing member 134.

The panel supporting part 132 having a predetermined shape is placed on the frame supporting part 104 of the set cover 100. The panel supporting part 132 may be formed of a plastic material, and the panel supporting part 132 may be a compressed product or molded product by an extrusion molding (or extrusion injection) method. The panel supporting part 132 supports the rear edge of the display panel 150.

The sealing member 134 is formed as one body with the lateral side of the panel supporting part 132, to thereby seal the gap between the display panel 150 and the set cover 100 to be explained. At this time, an upper surface of the sealing member 134 exactly meets with the sidewall of the set cover 100 along the same vertical line without being stepped, whereby the sealing member 134 is exposed to the external while being shown as the front of the display apparatus 10. The sealing member 134 of rubber, thermoplastic urethane, or thermoplastic elastomer may be formed as one body with the panel supporting part 132. That is, the panel supporting part 132 and the sealing member 134 may be formed at the same time by a double injection method or insert injection method.

Figure 2A:
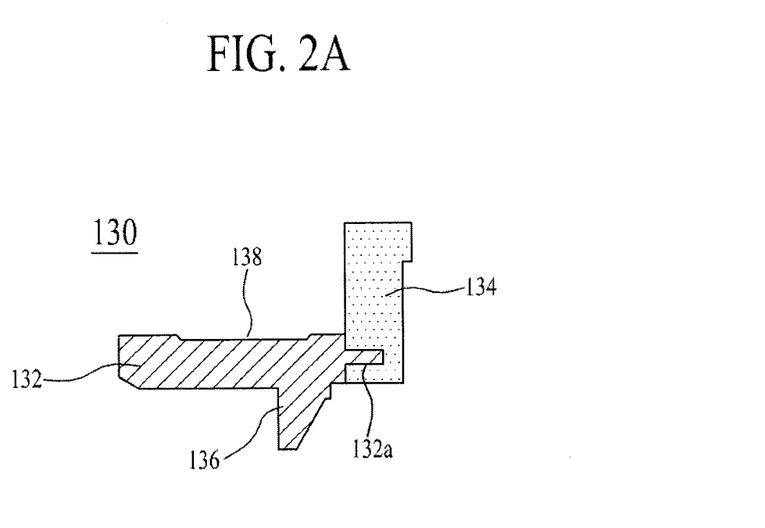
FIGS. 2A to 2C illustrate various embodiments of guide frame of FIG. 1.
Figure 2B:
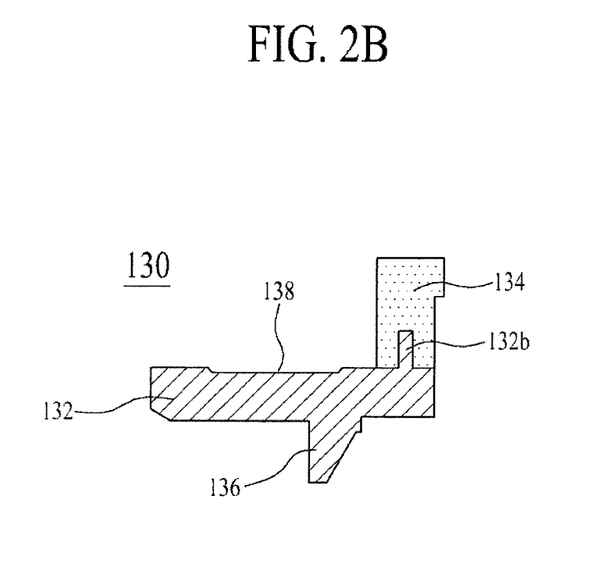

The sealing member 134 may be formed in various shapes by the double injection method, and may be formed as one body with the panel supporting part 132. For example, the sealing member 134 may be vertically formed to cover a projection 132a formed at one lateral side of the panel supporting part 132, as shown in FIG. 2A; or the sealing member 134 may be vertically formed to cover a projection 132b formed on a predetermined side portion of an upper surface of the panel supporting part 132, as shown in FIG. 2B. Also, the sealing member 134 without an additional projection may be vertically formed on a predetermined side portion of an upper surface of the panel supporting part 132, as shown in FIG. 2C.

Figure 2C:
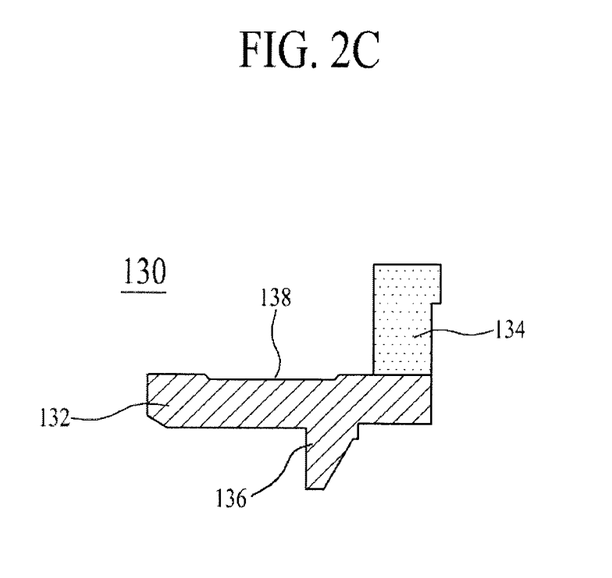

As shown in FIGS. 2A to 2C, the guide frame 130 may further include a frame fixing part 136 and an adhesive member guide groove 138.

The frame fixing part 136 protrudes at a predetermined height from a rear surface of the panel supporting part 132, and the protruding frame fixing part 136 is combined with the frame combining part 106 of the set cover 100. Thus, the guide frame 130 is fixed into the set cover 100 by combination of the frame fixing part 136 and the frame combining part 106. Meanwhile, the guide frame 130 may be combined with the frame supporting part 104 of the set cover 100 by the use of both-sided tape or adhesive. In this case, the frame fixing part 136 may be omitted.

The adhesive member guide groove 138 is hollowly formed with a predetermined depth from the upper surface of the panel supporting part 132, wherein the adhesive member 140 to be explained is adhered to the adhesive member guide groove 138. The adhesive member guide groove 138 may be omitted.

Referring once again to FIG. 1, the adhesive member 140 is formed on the panel supporting part 132 of the guide frame 130, to thereby adhere the display panel 150 into the guide frame 130. In this case, if the adhesive member guide groove 138 is formed in the panel supporting part 132, the adhesive member 140 is formed in the adhesive member guide groove 138 of the panel supporting part 132. The adhesive member 140 may be the both-sided tape or adhesive.

The display panel 150 is placed onto the panel supporting part 132 of the guide panel 130, wherein the display panel 150 displays a predetermined image in accordance with transmittance of light emitted from the backlight unit 120. For this, the display panel 150 includes a lower substrate 152, an upper substrate 154, a lower polarizing plate 156, and an upper polarizing plate 158.

The lower substrate 152 includes a plurality of gate lines (not shown), a plurality of data lines (not shown), and a plurality of pixels (not shown) formed every intersection of the gate and data lines.

Each pixel includes a thin film transistor (not shown) which is connected with the gate and data lines; a pixel electrode which is connected with the thin film transistor; and a common electrode which is formed adjacent to the pixel electrode and is supplied with a common voltage. The lower substrate 150 controls the transmittance of light in the liquid crystal layer by forming an electric field corresponding to a differential voltage between the data and common voltages applied to each pixel.

The upper substrate 154 includes a color filter corresponding to each pixel of the lower substrate 152. The upper substrate 154 is bonded to the confronting lower substrate 152 under the circumstance the liquid crystal layer is interposed between the lower and upper substrates 152 and 154. Depending on a driving method of the liquid crystal layer, the common electrode supplied with the common voltage may be formed on the upper substrate 154. The upper substrate 154 filters the light incident via the liquid crystal layer by the use of color filters, and emits the color-filtered light to the external, whereby colored images are displayed on the display panel 150.

A detailed structure of each of the lower and upper substrates 152 and 154 may vary according to a driving mode of the liquid crystal layer, for example, Twisted Nematic (TN) mode, Vertical Alignment (VA) mode, In-Plane Switching (IPS) mode, Fringe Field Switching (FFS) mode, and etc., which are generally known to those skilled in the art.

The lower polarizing plate 156 is formed on a rear surface of the lower substrate 152. The lower polarizing plate 156 polarizes the incident light, whereby the lower substrate 152 is irradiated with the light polarized by the lower polarizing plate 156.

The upper polarizing plate 158 is attached to an upper surface of the upper substrate 154, wherein the upper polarizing plate 158 polarizes the light incident via the upper substrate 154, and emits the polarized light to the external. An upper surface of the upper polarizing plate 158 is provided at the same horizontal line as an upper surface of the sidewall of the set cover 100. Also, the upper polarizing plate 158 is attached to an entire frontal surface of the upper substrate 154 so that a lateral side of the upper polarizing plate 158 is brought into contact with the sealing member 134 of the guide frame 130, preferably.

As mentioned above, the display panel 150 may be formed of a liquid crystal display panel which displays a predetermined image in accordance with transmittance of light emitted from the backlight unit 120, or may be formed of an organic light-emitting display panel which displays a predetermined image in accordance with a light emission of an light-emitting device.

The display panel 150 of the organic light-emitting display panel may include a lower substrate including a plurality of light-emitting cells formed every region defined by a gate line, a data line, and a power line (VDD); and an upper substrate being bonded to the lower substrate while confronting the lower substrate.

Each of the plurality of light-emitting cells on the lower substrate may include at least one switching transistor which is connected with the gate and data lines; at least one driving transistor which is connected with the switching transistor and the power line (VDD); and an light-emitting device which emits light in accordance with a current controlled by switching of the driving transistor.

The upper substrate may include an absorbent for protecting the light-emitting device from the moisture or atmosphere. The upper substrate may further include the light-emitting device which is connected with the driving transistor. In this case, the light-emitting device is removed from the lower substrate.

Meanwhile, in case of the display panel 150 of the organic light-emitting display panel, the above backlight unit 120 is removed since the organic light-emitting display panel emits light in itself.

The display panel 150 is placed onto the panel supporting part 132 of the guide frame 130 with the adhesive member 140 while being surrounded by the sealing member 134 of the guide frame 130. At this time, the sealing member 134 functions as a buffer from the pushing force of the display panel 150 placed onto the panel supporting part 132 of the guide frame 130. Also, the sealing member 134 seals the gap between the set cover 100 and the lateral side of the display panel 150.

By the use of adhesive member 140, the panel supporting part 132 of the guide frame 130 adheres to the rear edge portion of the lower substrate 152; or the panel supporting part 132 of the guide frame 130 adheres to the rear edge portion of the lower polarizing plate 156. Preferably, the adhesive member 140 adheres the panel supporting part 132 of the guide frame 130 to the rear edge portion of the lower substrate 152 so as to enhance the adhesive strength between the panel supporting part 132 and the display panel 150.

An assembling method of the display apparatus 10 according to the first embodiment of the present invention will be described as follows.

First, the bottom cover 110 or backlight unit 120 is received in the space 102 of the set cover 100.

Then, the guide frame 130 with the panel supporting part 132 and the sealing member 134 integrated thereinto is combined with the frame supporting part 104 of the set cover 100.

The adhesive member 140 is formed on the panel supporting part 132 of the guide frame 130.

The display panel 150 is placed onto the panel supporting part 132 on which the adhesive member 140 is formed. On combination of the display panel 150, after the sealing member 134 of the guide frame 130 is pushed through the lateral side of the display panel 150, the display panel 150 is placed onto the guide frame 130 by a forcible insertion. Thus, the sealing member 134 seals the gap between the sidewall of the set cover 100 and the lateral side of the display panel 150. Accordingly, the above sidewall of the set cover 100 and the sealing member 134 form the frontal edge portion of the display panel 150. Also, the respective upper surfaces of the sidewall of the set cover 100, the sealing member 134, and the upper polarizing plate 158 are provided at the same height along the same horizontal line, thereby realizing a borderless display apparatus without a border between a screen and a frame of the display apparatus.

In the above display apparatus 10 according to the first embodiment of the present invention, the display panel 150 is supported by the use of guide frame 130 having the sealing member 134 and the panel supporting part 132 by the double injection method. Thus, it is possible to decrease a thickness of the display apparatus by removing frontal and upper cases necessarily used for the general display apparatus, and to improving the sense of beauty in the frontal view of the display apparatus by realizing the borderless display apparatus without the border between the screen and the frame of the display apparatus. Especially, in case of the display apparatus 10 according to the first embodiment of the present invention, the gap between the sidewall of the set cover 100 and the lateral side of the display panel 150 is sealed by the use of sealing member 134 of the guide frame 130, whereby it is possible to seal (or remove) the gap between the set cover 100 and the lateral side of the display panel 150 without an additional structure, wherein the gap might occur by removing the frontal and upper cases.

The display apparatus 10 according to the first embodiment of the present invention may improve efficiency in assembling process by firstly combining the backlight unit 120 and the guide frame 130 in the set cover 100; and secondly combining the display panel 150 in the guide frame 130.

Figure 3:
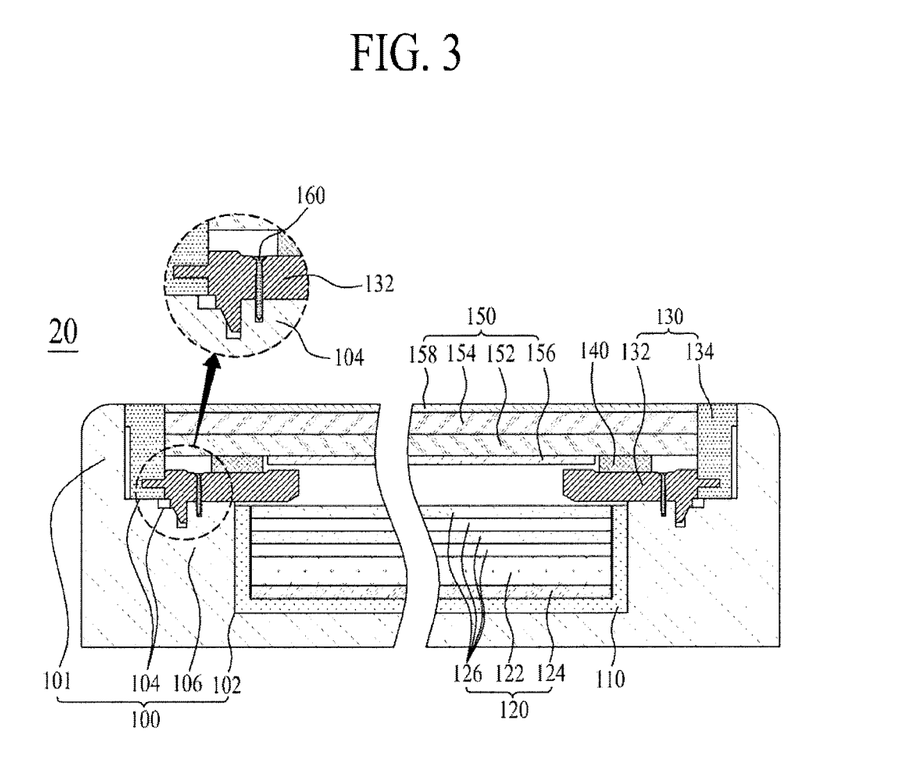
FIG. 3 illustrates a display apparatus according to the second embodiment of the present invention.

FIG. 3 is a cross section view illustrating a display apparatus according to the second embodiment of the present invention.

Referring to FIG. 3, the display apparatus 20 according to the second embodiment of the present invention includes a set cover 100, a bottom cover 110, a backlight unit 120, a guide frame 130, an adhesive member 140, a display panel 150, and a plurality of coupling members 160. Except the plurality of coupling members 160, the display apparatus 20 according to the second embodiment of the present invention is identical in structure to the display apparatus 10 according to the first embodiment of the present invention, whereby a detailed explanation for the same parts will be omitted, and the same reference numbers will be used throughout the drawings to refer to the same or like parts.

Each of the plurality of coupling members 160 enables to combine the guide frame 130 with a frame supporting part 104 of the set cover 100 by a front mounting method. Each of the plurality of coupling members 160 corresponds to a coupling screw. That is, each of the plurality of coupling members 160 is inserted into a panel supporting part 132 of the guide frame 130 and is then combined with the frame supporting part 104 of the set cover 100, whereby the guide frame 130 is fixed into the set cover 100 by the use of coupling members 160. A head in each of the plurality of coupling members 160 is inserted into a predetermined depth from the upper surface of the panel supporting part 132, to thereby prevent exposure of the head in each of the plurality of coupling members 160.

An assembling method of the display apparatus 20 according to the second embodiment of the present invention will be described as follows.

First, the bottom cover 110 or backlight unit 120 is received in the space 102 of the set cover 100.

Then, the guide frame 130 with the panel supporting part 132 and the sealing member 134 integrated thereinto is combined with the frame supporting part 104 of the set cover 100.

Figure 4:
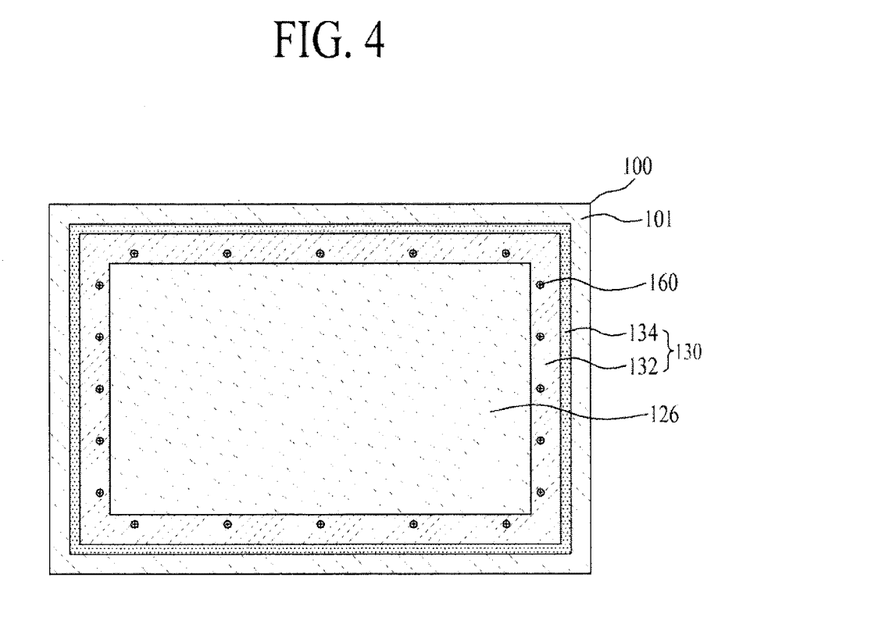
FIG. 4 illustrates a process for combining a guide frame with a set cover by the use of plurality coupling members.

As shown in FIGS. 3 and 4, the guide frame 130 is combined with the set cover 100 by the use of plurality coupling members 160 to be combined with the frame supporting part 104 of the set cover 100 through the panel supporting part 132.

The adhesive member 140 is formed on the panel supporting part 132 of the guide frame 130.

The display panel 150 is placed onto the panel supporting part 132 on which the adhesive member 140 is formed. On combination of the display panel 150, after the sealing member 134 of the guide frame 130 is pushed through the lateral side of the display panel 150, the display panel 150 is placed onto the guide frame 130 by a forcible insertion. Thus, the sealing member 134 seals the gap between the sidewall of the set cover 100 and the lateral side of the display panel 150. Accordingly, the above sidewall of the set cover 100 and the sealing member 134 form the frontal edge portion of the display panel 150. Also, the respective upper surfaces of the sidewall of the set cover 100, the sealing member 134, and the upper polarizing plate 158 are provided at the same height along the same horizontal line, thereby realizing a borderless display apparatus without a border between a screen and a frame of the display apparatus.

The display apparatus 20 according to the second embodiment of the present invention provides the same effects as those of the display apparatus 10 according the first embodiment of the present invention, and furthermore enhances fixation between the guide frame 130 and the set cover 100 by combining the guide frame 130 with the set cover 100 through the use of plurality coupling members 160.

Figure 5:
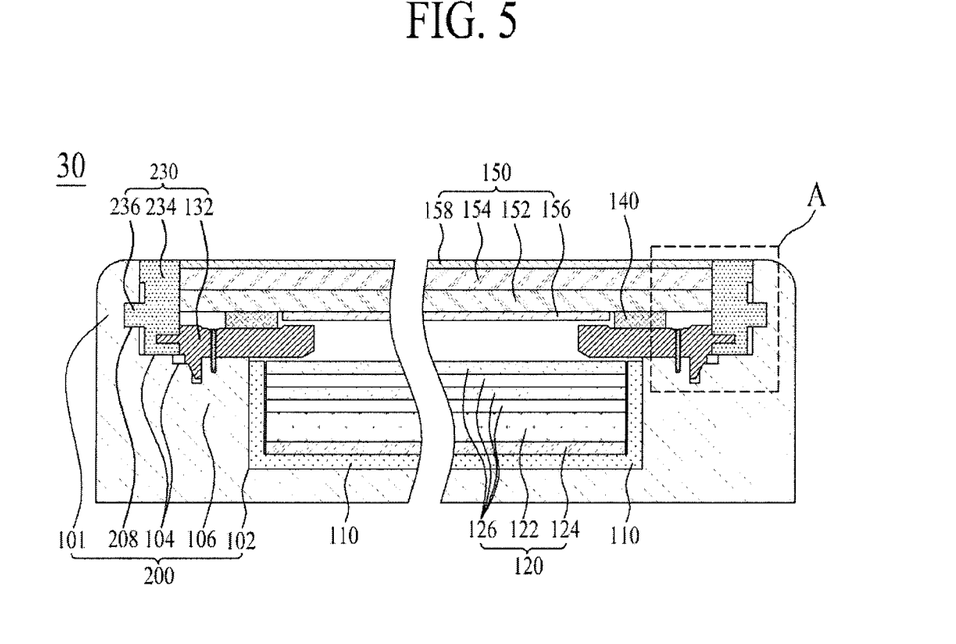
FIG. 5 illustrates a display apparatus according to the third embodiment of the present invention.
Figure 6:
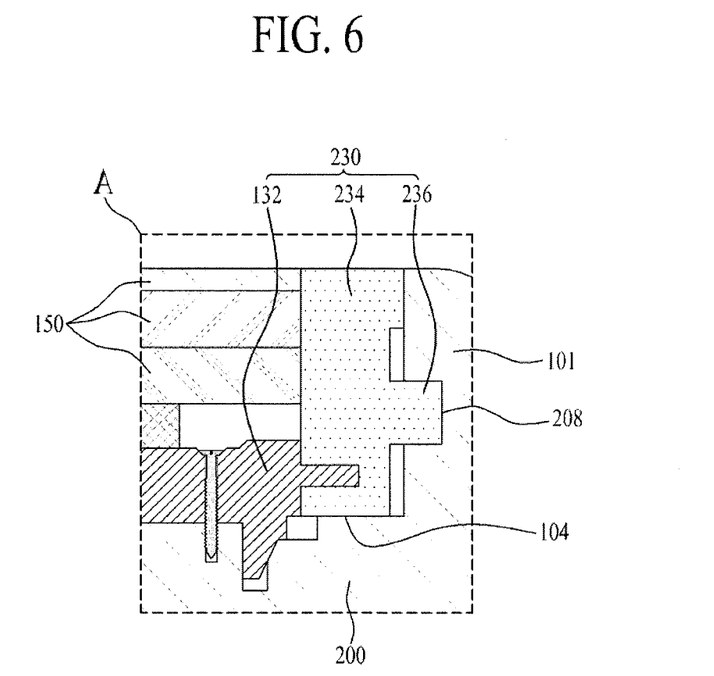
FIG. 6 is an expanded view showing 'A' of FIG. 5.

FIG. 5 is a cross section view illustrating a display apparatus according to the third embodiment of the present invention. FIG. 6 is an expanded view showing 'A' of FIG. 5.

Referring to FIGS. 5 and 6, the display apparatus 30 according to the third embodiment of the present invention includes a set cover 200, a bottom cover 110, a backlight unit 120, a guide frame 230, an adhesive member 140, a display panel 150, and a plurality of coupling members 160. Except the set cover 200 and the guide frame 230, the display apparatus 30 according to the third embodiment of the present invention is identical in structure to the display apparatus 20 according to the second embodiment of the present invention, whereby a detailed explanation for the same parts will be omitted, and the same reference numbers will be used throughout the drawings to refer to the same or like parts.

The set cover 200 includes a space 102, a frame supporting part 104, a frame combining part 106, and a sidewall groove 208. Except the sidewall groove 208 of the set cover 200, the set cover 200 of the display apparatus 30 according to the third embodiment of the present invention is identical in structure to the set cover of the display apparatus 10 according to the first embodiment of the present invention, whereby a detailed explanation for the same parts will be omitted, and the same reference numbers will be used throughout the drawings to refer to the same or like parts.

The sidewall groove 208 is hollowly formed from the inner sidewall while being provided adjacent to the upper surface of the sidewall of the set cover 200. That is, the sidewall groove 208 is hollowly formed to have a predetermined depth from the inner sidewall while being positioned corresponding to the upper portion of the frame supporting part 104.

The guide frame 230 includes a panel supporting part 132, a first sealing member 234, and a second sealing member 236.

The panel supporting part 132 is formed in a predetermined shape, and is placed onto the frame supporting part 104 of the set cover 100. The panel supporting part 132 may be formed of a plastic material, and the panel supporting part 132 may be a compressed product or molded product by an extrusion molding (or extrusion injection) method. The panel supporting part 132 supports the rear edge of the display panel 150.

The first sealing member 234 is formed as one body with the lateral side of the panel supporting part 132, to thereby seal the gap between the display panel 150 and the set cover 200. The first sealing member 234 is the same as the sealing member 134 of the guide frame 130 in the display apparatus 10 according to the first embodiment of the present invention, whereby a detailed explanation for the first sealing member 234 will be substituted by the above. The first sealing member 234 and the sidewall of the set cover 200 form the frontal edge portion of the display panel 150. Also, the respective upper surfaces of the sidewall of the set cover 200, the first sealing member 234, and the upper polarizing plate 158 are provided at the same height along the same horizontal line, thereby realizing a borderless display apparatus without a border between a screen and a frame of the display apparatus.

The second sealing member 236 protrudes from one surface of the first sealing member 234 which confronts the sidewall of the set cover 200, and then the protruding second sealing member 236 is inserted into the sidewall groove 208 of the set cover 200. That is, the second sealing member 236 protruding from the first sealing member 234 has such a length as to be inserted into the sidewall groove 208 of the set cover 200. Accordingly, the second sealing member 236 seals the sidewall groove 208 of the set cover 200, to thereby prevent foreign matters from penetrating into the inside of the display apparatus 30 via the minute gap which might exist between the set cover 200 and the first sealing member 234.

The panel supporting part 132, the first sealing member 234 and the second sealing member 236 may be formed simultaneously by the double injection method or insert injection method, thereby forming the guide frame 230.

The display apparatus 30 according to the third embodiment of the present invention may provide the same effects as those of the display apparatus 10 according to the first embodiment of the present invention or the display apparatus 20 according to the second embodiment of the present invention, and furthermore prevents the foreign matters from penetrating into the inside of the display apparatus 30 via the minute gap which might exist between the set cover 200 and the guide frame 230.

Accordingly, the display apparatus according to the present invention comprises the guide frame having the sealing member and the panel supporting part formed by the double injection method.

In case of the display apparatus according to the present invention, it is possible to decrease the thickness by removing the upper case and the front set cover which are generally used for the related art display apparatus, thereby improving the sense of beauty in the display apparatus by realizing the borderless display apparatus without the border between the screen and the frame of the display apparatus.

Also, the gap between the sidewall of the set cover and the lateral side of the display panel is sealed by the sealing member of the guide frame so that it is possible to remove the gap between the sidewall of the set cover and the display panel, wherein the gap might occur by removing the upper case and the front set cover without additional structures.

After sequentially combining the backlight unit and the guide frame with the set cover, the display panel is combined with the guide frame, thereby improving efficiency in the combining process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display apparatus comprising:
a display panel which includes lower and upper substrates bonded to each other;
a set cover which has a space prepared by a sidewall; and
a guide frame which supports a rear edge of the display panel, and seals a gap between the sidewall of the set cover and a lateral side of the lower substrate of the display panel, wherein the guide frame includes:
a panel supporting part which supports the rear edge of the display panel; and
a sealing member which seals the gap between the sidewall of the set cover and the lateral side of the lower substrate of the display panel, the sealing member contacting both the sidewall of the set cover and the lateral side of the lower substrate of the display panel,
wherein the display panel includes an upper polarizing plate attached to the front surface of the upper substrate, wherein respective upper surfaces of the sidewall of the set cover, the sealing member, and the upper polarizing plate are provided at the same height along the same horizontal line, and
wherein the sealing member is connected with the panel supporting part and is not overlapped with a front surface of the upper and lower substrates and the upper polarizing plate when viewing from a direction perpendicular to the front surface of the upper substrate.

2. The display apparatus according to claim 1, wherein the panel supporting part and the sealing member are formed as one body by a double injection method or insert injection method.

3. The display apparatus according to claim 2, wherein the sealing member is formed of rubber, thermoplastic urethane, or thermoplastic elastomer.

4. The display apparatus according to claim 1, wherein the sidewall of the set cover and the sealing member form a front edge portion of the display panel.

5. The display apparatus according to claim 1, further comprising a plurality of coupling members combined with the set cover via the panel supporting part, the coupling members for combining the guide frame with the set cover.

6. The display apparatus according to claim 1, further comprising an adhesive member formed between the panel supporting part and the display panel, the adhesive member for placing the display panel onto the panel supporting part.

7. The display apparatus according to claim 6, wherein the display panel includes a lower polarizing plate attached to a rear surface of the lower substrate, wherein the adhesive member is formed between the panel supporting part and the lower substrate, or between the panel supporting part and the lower polarizing plate.

8. The display apparatus according to claim 1, wherein the set cover includes a sidewall groove which is hollowly formed from an inner sidewall.

9. The display apparatus according to claim 8, wherein the sealing member includes:
   a first sealing member which is formed as one body with the panel supporting part, the first sealing member for sealing the gap between the sidewall of the set cover and the lateral side of the display panel; and
   a second sealing member which protrudes from the sidewall of the first sealing member, and is inserted into the sidewall groove of the set cover, the second sealing member for preventing foreign matters from being penetrated via a gap between the sidewall of the set cover and the first sealing member.

10. The display apparatus according to claim 9, wherein the first and second sealing members are formed of rubber, thermoplastic urethane, or thermoplastic elastomer.

11. The display apparatus according to claim 1, wherein the sealing member is connected with both the panel supporting part and the upper polarizing plate, and the sealing member is not overlapped with the front surface of the upper and lower substrates and the upper polarizing plate, when viewing in a front direction.

* * * * *